United States Patent Office 3,278,586
Patented Oct. 11, 1966

3,278,586
COMPLEX ESTERS OF SEBACIC ACID AND/OR AZELAIC ACID, NEOPENTYL GLYCOL AND 2,2,4-TRIMETHYL-PENTANOL-1
Elwin B. Ovist, Park Forest, Ill., assignor, by mesne assignments, to Sinclair Research, Inc., New York, N.Y., a corporation of Delaware
No Drawing. Original application May 9, 1958, Ser. No. 734,119. Divided and this application July 22, 1963, Ser. No. 303,460
The portion of the term of the patent subsequent to Aug. 24, 1982, has been disclaimed
2 Claims. (Cl. 260—485)

This application is a division of my application S.N. 734,119, filed May 9, 1958, now abandoned.

This invention relates to a new synthetic lubricant composition having exceptional thermal stability as well as viscosity characteristics which meet stringent requirements.

One manufacturer of turbo-prop engines requires that fluids used to lubricate these engines fulfill certain viscosity requirements, namely, the fluids must have a minimum viscosity of 7.5 centistokes (kinematic) at 210° F. and a maximum viscosity of 13,000 centistokes at —40° F. Mineral oil based lubricants cannot meet these requirements but synthetic ester lubricants—usually blends of a viscous complex ester or polyester with a less viscous diester—can be formulated to meet the specifications. In contradistinction to the Allison specifications recited above, the Pratt-Whitney specifications require a maximum viscosity of 13,000 cs. at —65° F. with a preferred minimum viscosity of 3 cs. at 210° F. These specifications warrant the use of a diester lubricant.

In the past, engine builders had not specified requirements for thermal stability of the lubricants used in the turbo-prop engines. However, one manufacturer has now included a thermal stability test specification in the requirements for fluids to be used in future applications. This is a definite indication of the inadequacy of existing ester fluids.

The purpose of this invention is to provide synthetic ester fluids of the stable all "neo" type that will meet the previously stated viscosity requirements for use in turbo-prop engines and possess both thermal and viscosity stability at high temperatures. These new synthetic ester fluids are formulated essentially from a major amount (about 60–85%) of a complex ester and a minor amount (about 15–40%) of a diester.

The complex ester is of the type X—Y—Z—Y—X in which X represents a mono-alcohol residue, Y represents a dicarboxylic acid residue and Z represents a neo-pentyl glycol residue and the linkages are ester linkages. These esters have been found to be especially adaptable to the conditions to which turbine engines are exposed, since they can be formulated to give a desirable combination of high flash point, low pour point, and high viscosity at elevated temperatures, and need contain no additives which might leave a residue upon volatilization. In addition, many complex esters have shown good stability to shear. In the complex ester used to make the novel lubricant of this invention the "X" and "Z" components have no hydrogens on the beta carbon atoms, and thus are neo-structured.

The mono-alcohol component has alkyl side chains attached to the beta carbon and thus has no beta hydrogens. Although both neo-$C_7$ alcohol and neo-$C_8$ alcohol may be used to manufacture esters of good thermal stability, it has been found that of these only the neo-$C_8$ alcohol—2,2,4-trimethyl-pentanol-1—gives complex esters suitable for blending with diesters to produce lubricants which meet the Allison viscosity requirements while remaining stable at high temperatures. The preferred dibasic acids are sebacic and azelaic or mixtures thereof. Minor amounts of adipic used with a major amount of sebacic also may be used with advantage; see copending application Serial No. 703,275, filed December 17, 1957, now abandoned. Where azelaic acid is used without mixture with another acid, the complex ester has been found to have superior corrosion resisting characteristics. In order for synthetic lubricants to meet certain specifications regarding the corrosive effect which the lubricants have upon lead and other metals with which they come into contact in actual use, it has been found advantageous to formulate the lubricant so that it contains up to 0.01% free dicarboxylic acid. This free acid content, however, usually worsens the panel coking effect of the lubricant. But when the complex ester component of the lubricant is made from 100% azelaic acid, no excessive panel coking was observed despite the presence of 0.01% free dibasic acid.

The complex esters are prepared by reaction of two moles of dibasic acid, two moles of 2,2,4-trimethyl-pentanol-1 (neo-octyl alcohol) and one mole of neopentyl glycol preferably in the presence of a catalyst and solvent or water entraining agent to insure maintenance of the liquid state during the reaction. Aromatic hydrocarbons such as xylene or toluene have proven satisfactory as solvents. The choice of solvent influences the choice of temperature at which the esterification is conducted; for instance, when toluene is used, a temperature of 140° C. is recommended; with xylene, temperatures up to about 195° C. may be used. To provide a better reaction rate an acid esterification catalyst is often used. Many of these catalysts are known and include, for instance, HCl, $H_2SO_4$, $NaHSO_4$, aliphatic and aromatic sulfonic acids, phosphoric acid, hydrobromic acid, HF and dihydroxyfluoboric acid. Other catalysts are thionyl chloride, boron trifluoride, and silicon tetrafluoride.

The preferred catalyst is a glycol titanate such as described in copending application Serial No. 719,760, filed March 7, 1958, now abandoned, herein incorporated by reference. One such catalyst is a composition containing approximately equal amounts of di-2-ethylhexyl sebacate and a polymer formed by the hydrolysis of tetra-(2-ethyl-1,3-hexanediol)-titanate. In the preferred reaction, about 0.5 to about 1 weight percent, or advantageously 0.2 to 0.5% of the catalyst is used with a xylene solvent at a temperature of 165 to 200° C. while refluxing water. The temperatures of the reaction must be sufficient to remove the water from the esterification mass as it is formed. This temperature is usually at least about 140° C. but not so high as to decompose the wanted product. The highest temperature needed for the reaction will probably be about 200° C., preferably not over about 175° C. The pressure is conveniently about atmospheric. Although reduced pressure or superatmospheric pressure could be utilized, there is usually no necessity to use reduced pressures, as the temperatures required at atmospheric pressure to remove the water formed do not usually unduly degrade the product.

The complex esters are made by either a one-stage or a two-stage reaction. In method I, about one mole of neopentyl glycol, about 2 moles of the dicarboxylic acid, or mixture of acids, about 2 moles of the neo-octyl alcohol and about 0.05 to 0.5 percent of the catalyst based on the total weight of reactants are added to just enough xylene or toluene to dissolve the soluble components. This mixture is reacted, preferably in an apparatus fitted with a water trap and a reflux condenser at a temperature of 100 to 140° C., when using toluene, or even up to about 195° C. when xylene is employed, and the reaction continued under reflux until the theoretical amount of water is collected.

In method II, about 2 moles of neo-octyl alcohol and about 2 moles of the dicarboxylic acid or mixture of dicarboxylic acids are reacted at a temperature between 100 and 190° C. while refluxing in the presence of the solvent, or water entraining agent, and 0.05 to 0.5 percent of the catalyst based on the total weight of the reactants to be used. When water ceases to be collected in the trap, about one mole of neopentyl glycol is added and the reaction is resumed. This reaction, too, is terminated when no more water is collected.

After the complex ester is prepared by either of these variations, it can be "capped" by the addition of a 10% excess of a monohydric alcohol which may be the same alcohol used in the esterification, or a different one. The reaction conditions are resumed and continued until once again water ceases to be evolved.

A low acid number is required in many applications of synthetic lubricating compositions containing complex esters, because of corrosion factors. It is standard practice, when complex esters are made using the conventional acid catalysts such as sodium bisulfate or paratoluenesulfonic acid to give the esters an after-treat by washing the ester with a 5 percent aqueous $K_2CO_3$ solution or by heating the ester in an autoclave for 15 hours at 340 to 350° F. with 10 weight percent of propylene oxide. This treatment, however, is usually not needed when the complex esters are manufactured using a glycol titanate catalyst since the ester products customarily have low acid numbers, for instance in the acceptable range between 0.05 to 0.25, without this after-treatment.

It is conventional in the manufacture of complex esters to subject the product, after capping, to filtration to remove insoluble materials. After this it is also conventional to subject the product to a reduced pressure distillation or stripping at 100° to 200° C. to remove volatile materials, such as water, the solvent, and light ends.

The diesters which are blended with the complex esters so prepared, to give the novel lubricants of this invention, are the reaction products of one mole of dibasic acid with two moles of a monohydric alcohol. The preferred reactants are the same as those used to make the complex esters—sebacic or azelaic acid or mixtures of the two—and 2,2,4-trimethyl-pentanol-1. The diester may be prepared by using the first step of method II described above, except that about one mole of dibasic acid is reacted for each two moles of monohydric alcohol.

In addition, commercially available diesters of lubricating viscosity such as di-2-ethylhexyl sebacate (Plexol 201) and diisooctylazelate (DiOAz) may be compounded with the all-neo complex ester. The latter diester is a product made by the esterification of azelaic acid with an alcohol mixture made by the oxo process from $C_3$–$C_4$ copolymer heptanes. This alcohol mixture contains 17% 3,4-dimethylhexanol; 29% 3,5-dimethylhexanol; 25% 4,5-dimethylhexanol; 1.4% 5,5-dimethylhexanol; 16% of a mixture of 3-methylheptanol and 5-ethylheptanol; 2.3% 4-ethylhexanol; 4.3% α-alkyl alkanols and 5% other materials. Although blends of the all-neo complex ester with such diesters can be formulated to pass the Allison specifications, such blends do not have as much thermal stability as the blends which use the neo-octyl diester.

The diesters of lubricating viscosity are blended with the complex esters by stirring together a quantity of diester and complex ester at an elevated temperature, selecting the proportion of each component which will give the desired viscosity. The finished blend will usually contain essentially about 60 to 85 percent of the complex ester— frequently about 65 to 70 percent. Thus the diester will be about 15 to 40 percent, preferably about 30 to 35 percent, of the blend. The blend can also include up to about 1 percent or more by weight of an oxidation inhibitor, such as phenothiazine and may also contain a foam inhibitor such as "DCF" or other additives to provide particular characteristics. "DCF" is a liquid methyl silicone polymer having a viscosity of 60,000 cs. at 25° C. In general, DC–200 fluids of 60,000 to 1,000,000 cs. at 25° C. may be used.

EXAMPLE

The following is a specific example of the manufacture of the composition of this invention. This example is to be considered as illustrative only and not limiting. 144 g. (1.1 M) of 2,2,4-trimethyl-pentanol-1, 141.4 g. (0.7 M) sebacic acid, 54.6 g. (0.3 M) azelaic acid, 52 g. (0.5 M) neopentyl glycol, 3.5 g. of the glycol titanate polymer mixture described above and 150 g. xylene were charged to a 1-liter 4-neck flask which was equipped with a stirrer, thermometer and water trap below a reflux condenser. The reaction flask was heated by a heating mantle. The mixture was stirred at reflux temperature.

After 19 hours, 36.5 cc. of water had been collected in the trap and the temperature was 160° C. 21 g. of neo-octyl alcohol was added and refluxing was resumed. The refluxing was continued to give a total refluxing time of 43 hours. The reaction mixture had an acid number of 0.2. It was stripped, at 200° C. at 4 mm. for 2 hours and then filtered with Super Cel filter aid. The complex ester had the following characteristics.

Acid No. _____ 0.22
Sap. No. _____ 318.4
K.V.:
  At 100° F., cs. _____ 67.12
  At 210° F., cs. _____ 11.25

This ester is reported in Table I below as Sample 331.

A diester was prepared as follows: 205 g. (1.58 M) of 2,2,4-trimethyl-pentanol-1, 132 g. (0.655 M) sebacic acid, 100 g. xylene and 3 g. of the glycol titanate polymer mixture described above were charged to a 2-liter 3-neck flask which was equipped with a thermometer, stirrer and water trap below a reflux condenser. The reaction flask was heated by a heating mantle. The reaction mixture was stirred at reflux temperature.

After 94½ hours of refluxing, 23 cc. of $H_2O$ had been collected and the temperature of the reaction mass was 169° C. The reaction mixture had an acid number of 0.2. It was stripped at 200° C. for 2 hours at 4 mm. giving an acid number of 0.09. This sample was fractionated as follows:

| Cut No. | Vapor Temp., °F. | Pressure, mm. |
| --- | --- | --- |
| 1 | 398 | 1.2 |
| 2 | 402 | 1.2 |
| 3 | 396 | 1.0 |
| 4 | 396 | 1.0 |
| 5 | 394 | .9 |
| 6 | 393 | .8 |
| 7 | 385 | .6 |
| 8 | 385 | .6 |
| 9 | 384 | .5 |
| 10 | 388 | .5 |
| 11 | 405 | 1.0 |

Cuts 3 through 10 were composited to give a sample having the following characteristics.

Acid No. _____ 0.17
Sap. No. _____ 259.1
K.V.:
  At 100° F., cs. _____ 14.25
  At 210° F., cs. _____ 3.702
Micro flash, ° F. _____ 395
Actual pour, ° F. _____ Below −80

This diester is reported in Table I as Sample 005. A blend containing 67% of the complex ester and 33% of the diester had the following viscosities.

K.V.:
  At 210° F., cs. _____ 7.814
  At −40° F., cs. _____ 11,946

This blend is reported in Table II as Sample A. It will be noted that this blend meets the Allison viscosity specifications.

Table I reports the composition and characteristics of various complex esters and diesters made as in the previous examples. Table II reports on blends of these esters with each other and with Plexol 201J, a commercially available di-[2-ethylhexyl] sebacate which has a kinematic viscosity at 210° F. of about 3.5, and at 100° F. of about 12.5; a viscosity index of 154, a pour point below −80° F. and an acid number of 0.12, and which contains a small amount of free sebacic acid.

viscosity requirements of the Allison specification. Where the neo-$C_7$ alcohol was used in either the complex ester or the diester as the monohydric alcohol, the blends did not meet these viscosity requirements.

Samples of the complex esters and diesters, and blends L and M, as well as a sample of Plexol 201 were subjected to a severe test to determine their relative high temperature stabilities. The test involved holding the samples in a nitrogen atmosphere at an elevated tempera-

*Table I*

Diesters and Complex Esters

| Sample No. | 005 | 293 | 309 | 311 | 316 | 328 | 331 | 335 | 353 | 6140 |
|---|---|---|---|---|---|---|---|---|---|---|
| Molar Ratio of Reactants: | | | | | | | | | | |
| Azelaic Acid | | 0.3 | | 2 | 0.3 | 1 | 0.6 | 0.6 | | 1. |
| Sebacic Acid | 1 | 1.7 | 1 | | 1.7 | | 1.4 | 1.4 | 1 | |
| Neopentyl glycol | | 1 | | 1 | 1 | 2 | 1 | 1 | | 2. |
| Neo-$C_7$ alcohol[1] | | | 2 | 2 | 2 | 2 | | | 2 | |
| Neo-$C_8$ alcohol | 2 | | | | | | 2 | | | $NaHSO_4$. |
| Catalyst | Glycol titanate polymer | None | None | Glycol titanate polymer | None | Clay | None | Washed distilled. |
| Aftertreat | Distilled | None | Distilled | Clay | Distilled | None | Clay | Distilled | 0.0. |
| Acid No. | 0.17 | 0.19 | 0.45 | 0.29 | 0.34 | 0.48 | 0.22 | 0.35 | 1.58 | 258.3. |
| Sap. No. | 259.1 | 330.7 | 281.5 | 349.4 | 331.1 | 288.6 | 318.4 | 333.7 | 280.2 | |
| K.V. at— | | | | | | | | | | |
| 210° F., cs | 3.702 | 11.76 | 3.485 | 10.47 | 10.34 | 3.188 | 11.25 | 11.06 | 3.472 | 3.821. |
| 100° F., cs | 14.25 | 77.80 | 14.41 | 68.81 | 65.57 | 12.77 | 67.12 | 71.53 | 14.55 | 14.87. |
| −40° F., cs | | Stiff | 3,584 | Stiff | Stiff | 3,122 | Stiff | Stiff | 3,684 | |
| Micro Flash, ° F | 395 | | | 435 | 425 | 410 | | 425 | | 425. |
| Actual Pour, ° F | Below −80 | | | −62 | −64 | Below −80 | | −64 | | Below −80. |

[1] 2,2-dimethyl-pentanol-1.

ture for an extended period. The changes in the properties of some of the samples are recorded in Table III.

*Table III*

HEAT TEST RESULTS

| Sample No. | 005 | 293 | 309 | 310* | 311 | 328 | 335 | 353 | 353 | 353 | Plexol 201 | | L | M |
|---|---|---|---|---|---|---|---|---|---|---|---|---|---|---|
| Temp., ° F | 650 | 650 | 650 | 547 | 650 | 650 | 547 | 650 | 650 | 650 | 600 | 650 | 650 | 650 |
| Hours | 10 | 6 | 6 | 10 | 6 | 6 | 10 | 20 | 40 | 80 | 6 | 4 | 6 | 6 |
| Percent Wt. Loss | 10 | ~10 | ~5 | 1 | 5 | 2.5 | 1 | 5 | 14 | 19 | 20−25 | | 5 | 12 |
| Percent Vis. Change at— | | | | | | | | | | | | | | |
| 210° F | −9.5 | −4.95 | −1.41 | −0.918 | −7.74 | −0.88 | −0.725 | −3.38 | −1.18 | +0.95 | +11.7 | solid | −13.6 | −4.56 |
| 100° F | −16.6 | −7.2 | −4.58 | −2.78 | −10.07 | −1.41 | −0.282 | −7.08 | −5.00 | −1.79 | +15.5 | | −19.2 | −3.22 |
| Acid No. Change | 1.26 | 5.95 | 2.13 | 3.51 | 8.24 | 3.54 | 3.85 | −0.82 | 0.52 | −0.25 | 22.9 | | 2.58 | 2.91 |
| Percent Decomposition | 0.486 | 1.81 | .757 | 1.25 | 2.36 | 1.23 | 1.15 | 0.292 | 0.182 | | 8.84 | | 0.88 | 1.0 |

*This sample was the same in composition and properties as Sample 309.

*Table II*

| Blend No. | Complex Ester of Sample | | Diester of Sample | | Kinematic Viscosity (° F.), cs. | | |
|---|---|---|---|---|---|---|---|
| | | | | | At −40 | At 100 | At 210 |
| A | 67% | 331 | 33% | 005 | 11,946 | | 7.814 |
| B | 72% | 335 | 28% | 309 | 28,820 | 43.52 | 7.923 |
| C | (*) | | 70% | 005 | 18,739 | 38.77 | 7.205 |
| D | 75% | 316 | 25% | Plexol 201 | 20,509 | 41.53 | 7.617 |
| E | 69% | 331 | 31% | Plexol 201 | 11,538 | 37.78 | 7.490 |
| F | 69% | 331 | 31% | 309 | 17,275 | 40.92 | 7.757 |
| G | 72% | 331 | 28% | 309 | 17,938 | 43.03 | 8.033 |
| H | 71% | 335 | 29% | Plexol 201 | 11,591 | | 6.587 |
| J | 74% | 335 | 26% | Plexol 201 | 19,648 | | 7.715 |
| K | 69% | 335 | 31% | 309 | 26,502 | 42.29 | 7.626 |
| L | 20% | 293 | 80% | 309 | | 22.39 | 4.823 |
| M | 20% | 316 | 80% | 309 | | 19.25 | 4.304 |
| O | 67% | 331 | 33% | 005 | 12,284 | 39.18 | 7.758 |

*005 was blended with another diester, i.e. 30% Plexol 201.

It will be observed from these tables that it was possible to produce blends of the neo-octyl complex ester with either the neo-octyl diester or Plexol 201 which met the viscosity requirements of the Allison specification.

The data in Table III show the much greater heat stability of complex ester, diesters and ester blends which have been manufactured by the use of neo-type alcohols than those which contain the residue of an alcohol which contains beta hydrogen atoms.

I claim:
1. A complex ester of the type monohydric alcohol-dibasic acid-glycol-dibasic acid-monohydric alcohol where the glycol is neopentyl glycol, the monohydric alcohol is 2,2,4-trimethyl-pentanol-1 and the dibasic acid is selected from the group consisting of sebacic acid, azelaic acid and mixtures of the same.

2. The complex ester X—Y—Z—Y—X in which X is the residue of 2,2,4-trimethyl-pentanol-1, Y is the residue of azelaic acid and Z is the residue of neopentyl glycol.

References Cited by the Examiner

UNITED STATES PATENTS 2,499,984  3/1950  Beavers et al. _____ 260—485

LORRAINE A. WEINBERGER, *Primary Examiner.*

H. G. MOORE, LEON ZITVER, *Examiners.*

I. R. PELLMAN, *Assistant Examiner.*